United States Patent
Watanabe et al.

(10) Patent No.: US 7,639,997 B2
(45) Date of Patent: Dec. 29, 2009

(54) RADIO COMMUNICATION SYSTEM

(75) Inventors: Manabu Watanabe, Osaka (JP);
Yuusuke Yamaoka, Osaka (JP)

(73) Assignee: Panasonic Corporation, Osaka (JP)

( * ) Notice: Subject to any disclaimer, the term of this patent is extended or adjusted under 35 U.S.C. 154(b) by 505 days.

(21) Appl. No.: 11/712,472

(22) Filed: Mar. 1, 2007

(65) Prior Publication Data
US 2007/0207764 A1 Sep. 6, 2007

(30) Foreign Application Priority Data
Mar. 1, 2006 (JP) ............................. 2006-054452

(51) Int. Cl.
*H04B 1/06* (2006.01)
(52) U.S. Cl. .................. 455/226.1; 455/254; 455/266
(58) Field of Classification Search ................ 455/214, 455/226.1, 234.1, 234.2, 254, 255, 259, 260, 455/266, 307, 337; 375/316
See application file for complete search history.

(56) References Cited
U.S. PATENT DOCUMENTS
2004/0198288 A1* 10/2004 Sadowski ................. 455/259
2005/0013386 A1* 1/2005 Ojard ....................... 375/316

OTHER PUBLICATIONS

Tanaka, A., et al. "Low Noise Amplifier with Center Frequency Hoping for an MB-OFDM UWB Receiver" Joint Conference on Ultrawideband Systems and Technologies, International Workshop on IEEE, Mar. 18-21, 2004, pp. 420-423.

* cited by examiner

*Primary Examiner*—Thanh C Le
(74) *Attorney, Agent, or Firm*—McDermott Will & Emery LLP

(57) ABSTRACT

The communication performance of a radio communication system is improved while keeping short time necessary for attaining synchronization. A low noise amplifier is selectively provided with one of an input signal supplied from the outside of the system and an oscillation output signal of a local oscillator. A mixer integrates the oscillation output signal of the local oscillator and an output signal of the low noise amplifier. An intensity discriminating unit discriminates the signal intensity of an output of the mixer. In a first state, the low noise amplifier amplifies the oscillation output signal of the local oscillator, and a control unit learns a frequency band of the low noise amplifier for maximizing the signal intensity on the basis of the discrimination result of the intensity discriminating unit. In a second state, the low noise amplifier is set to the frequency band learned in the first state and amplifies the input signal.

8 Claims, 3 Drawing Sheets

RADIO COMMUNICATION SYSTEM

CROSS-REFERENCE TO RELATED APPLICATIONS

This application claims priority under 35 U.S.C. §119 on Patent Application No. 2006-54452 filed in Japan on Mar. 1, 2006, the entire contents of which are hereby incorporated by reference.

BACKGROUND OF THE INVENTION

The present invention relates to a radio communication system correlated with, for example, UWB (Ultra Wide Band) communication or the like using signals of a ultra wide frequency band.

Recently, in accordance with rapid increase of information content, there are increasing demands for a large capacity and a high speed for interchange and transmission of information data. In order to meet such demands, techniques relating to radio communication are being rapidly developed.

The radio communication is now spreading in offices and homes because there is no need to provide cables and the like. In particular, UWB communication expected for communication with small power consumption is regarded as a promising communication method.

In the UWB communication, ultra wide band signals utilizing a frequency band of 1.5 GHz or more or a frequency band exceeding 25% of the center frequency are used. As one communication system of the UWB communication, an MB-OFDM (multiband orthogonal frequency-division multiplexing) system in which a carrier frequency is hopped every given period has been proposed.

FIG. 6 is a diagram for showing an exemplified conventional radio communication system. The architecture shown in FIG. 6 employs the MB-OFDM system (see Akio Tanaka, Hiroshi Kodama, Akifumi Kasamatsu, "Low Noise Amplifier with Center Frequency Hoping for an MB-OFDM UWB Receiver", Ultra Wideband systems, 2004, Joint with Conference on Ultrawideband Systems and Technologies, Joint UWBST & IWUWBS. 2004 International Workshop on, IEEE, Mar. 18-21, 2004, pp. 420-423). In FIG. 6, a reference numeral 91 denotes an antenna, a reference numeral 92 denotes a band pass filter (BPF) of a narrow band, a reference numeral 93 denotes a low noise amplifier (LNA) capable of hopping a gain frequency band, a reference numeral 94 denotes a balun for converting a single input into a differential signal, reference numerals 95a and 95b are mixers, a reference numeral 96 denotes a demodulator unit and a reference numeral 97 denotes a local oscillator (LO) capable of hopping a frequency.

In a receiving operation, the antenna 91 receives a signal from a transmitter antenna, and the signal transferred through the band pass filter 92 is amplified by the low noise amplifier 93. Thereafter, the signal is subjected to single-differential conversion by the balun 94, and the resultant signal is shifted in the frequency by the mixers 95a and 95b and the local oscillator 97, so as to be demodulated by the demodulator unit 96.

At this point, in the MB-OFDM system for the UWB, for hopping the carrier frequency, the gain frequency band of the low noise amplifier 93 is also hopped for amplifying the signal in a selected band. In this manner, a high gain is realized as compared with the case where a signal of a wide band is amplified, and thus, a good communication system is obtained.

In the conventional method, however, there is a problem that the communication performance is degraded when the frequency band of a signal amplified by the low noise amplifier and the hopping frequency of the local oscillator are shifted from each other. Furthermore, it is necessary to transmit a pilot signal from a transmitter for correcting the shift, and hence, it disadvantageously takes time to attain synchronization for starting communication.

SUMMARY OF THE INVENTION

An object of the invention is improving communication performance of a radio communication system while keeping short time necessary for attaining synchronization.

According to a first aspect of the invention, the radio communication system includes a local oscillator; a selection unit that receives an input signal and an oscillation output signal of the local oscillator as inputs and selectively outputs one of the received signals; a low noise amplifier that is capable of hopping a frequency band to be amplified and amplifies an output of the selection unit; a mixer that integrates the oscillation output signal of the local oscillator and an output signal of the low noise amplifier; an intensity discriminating unit that discriminates signal intensity of an output of the mixer; and a control unit that controls a selection operation of the selection unit and a frequency band of the low noise amplifier, and the control unit learns a frequency band of the low noise amplifier for maximizing the signal intensity on the basis of a discrimination result of the intensity discriminating unit in a first state where the selection unit is controlled to selectively output the oscillation output signal of the local oscillator, and the control unit sets the frequency band learned in the first state in the low noise amplifier in a second state where the selection unit is controlled to selectively output the input signal.

In the first aspect of the invention, in the first state, the low noise amplifier amplifies the oscillation output signal of the local oscillator selectively output by the selection unit, and at this point, a frequency band for maximizing the signal intensity is learned on the basis of the discrimination result of the discriminating unit for receiving the output of the mixer. In the second state, the frequency band learned in the first state is set in the low noise amplifier, and the input signal selectively output by the selection unit is amplified. Thus, a shift of the frequency band of the low noise amplifier can be corrected. In addition, there is no need to send a pilot signal from a transmitting side for this shift correction.

According to a second aspect of the invention, the radio communication system includes a local oscillator; a first low noise amplifier that is capable of hopping a frequency band to be amplified and amplifies an oscillation output signal of the local oscillator; a second low noise amplifier that is capable of hopping a frequency band to be amplified and amplifies an input signal; a mixer that integrates the oscillation output signal of the local oscillator and an output signal of the first or second low noise amplifier; an intensity discriminating unit that discriminates signal intensity of an output of the mixer; and a control unit that controls amplification operations and frequency bands of the first and second low noise amplifiers, and the control unit learns a frequency band of the first low noise amplifier for maximizing the signal intensity on the basis of a discrimination result of the intensity discriminating unit in a first state where the first low noise amplifier is controlled to perform an amplification operation, and the control unit sets the frequency band of the first low noise amplifier learned in the first state in the second low noise amplifier in a second state where the second low noise amplifier is controlled to perform an amplification operation.

In the second aspect of the invention, in the first state, the first low noise amplifier amplifies the oscillation output signal of the local oscillator, and at this point, a frequency band for maximizing the signal intensity is learned on the basis of the discrimination result of the discriminating unit for receiving the output of the mixer. In the second state, the frequency band of the second low noise amplifier is set to be equal to the frequency band of the first low noise amplifier learned in the first state, and the input signal is amplified. Thus, a shift of the frequency band of the second low noise amplifier can be corrected. In addition, there is no need to send a pilot signal from a transmitting side for this shift correction.

According to a third aspect of the invention, the radio communication system includes a local oscillator; a selection unit that receives an input signal and an oscillation output signal of the local oscillator as inputs and selectively outputs one of the received signals; a low noise amplifier that is capable of hopping a frequency band to be amplified and amplifies an output of the selection unit; an intensity discriminating unit that discriminates signal intensity of an output of the low noise amplifier; and a control unit that controls a selection operation of the selection unit and a frequency band of the low noise amplifier, the control unit learns a frequency band of the low noise amplifier for maximizing the signal intensity on the basis of a discrimination result of the intensity discriminating unit in a first state where the selection unit is controlled to selectively output the oscillation output signal of the local oscillator, and the control unit sets the frequency band learned in the first state in the low noise amplifier in a second state where the selection unit is controlled to selectively output the input signal.

In the third aspect of the invention, in the first state, the low noise amplifier amplifies the oscillation output signal of the local oscillator selectively output by the selection unit, and at this point, a frequency band for maximizing the signal intensity is learned on the basis of the discrimination result of the discriminating unit for receiving the output of the mixer. In the second state, the frequency band learned in the first state is set in the low noise amplifier, and the input signal selectively output by the selection unit is amplified. Thus, a shift of the frequency band of the low noise amplifier can be corrected. In addition, there is no need to send a pilot signal from a transmitting side for this shift correction.

According to a fourth aspect of the invention, the radio communication system includes a local oscillator; a selection unit that receives an input signal and an oscillation output signal of the local oscillator as inputs and selectively outputs one of the received signals; a band pass filter that is capable of hopping a frequency band to be selected and selects a frequency band in response to an output of the selection unit; an intensity discriminating unit that discriminates signal intensity of an output of the band pass filter; and a control unit that controls a selection operation of the selection unit and a frequency band of the band pass filter, the control unit learns a frequency band of the band pass filter for maximizing the signal intensity on the basis of a discrimination result of the intensity discriminating unit in a first state where the selection unit is controlled to selectively output the oscillation output signal of the local oscillator, and the control unit sets the frequency band learned in the first state in the band pass filter in a second state where the selection unit is controlled to selectively output the input signal.

In the fourth aspect of the invention, in the first state, the band pass filter receives the oscillation output signal of the local oscillator, and at this point, a frequency band for maximizing the signal intensity is learned on the basis of the discrimination result of the discriminating unit for receiving the output of the band pass filter. In the second state, the frequency band learned in the first state is set in the band pass filter, and the filtering operation is performed on the input signal. Thus, a shift of the frequency band of the band pass filter can be corrected. In addition, there is no need to send a pilot signal from a transmitting side for this shift correction.

As described above, according to the present invention, the shift of the frequency band of the low noise amplifier or the band pass filter can be corrected. In addition, there is no need to send a pilot signal from a transmitting side for this shift correction. Accordingly, degradation of the communication performance can be prevented in a short period of time, resulting in improving the communication performance.

DETAILED DESCRIPTION OF THE INVENTION

Preferred embodiments of the invention will now be described with reference to the accompanying drawings.

Embodiment 1

Figure 1:
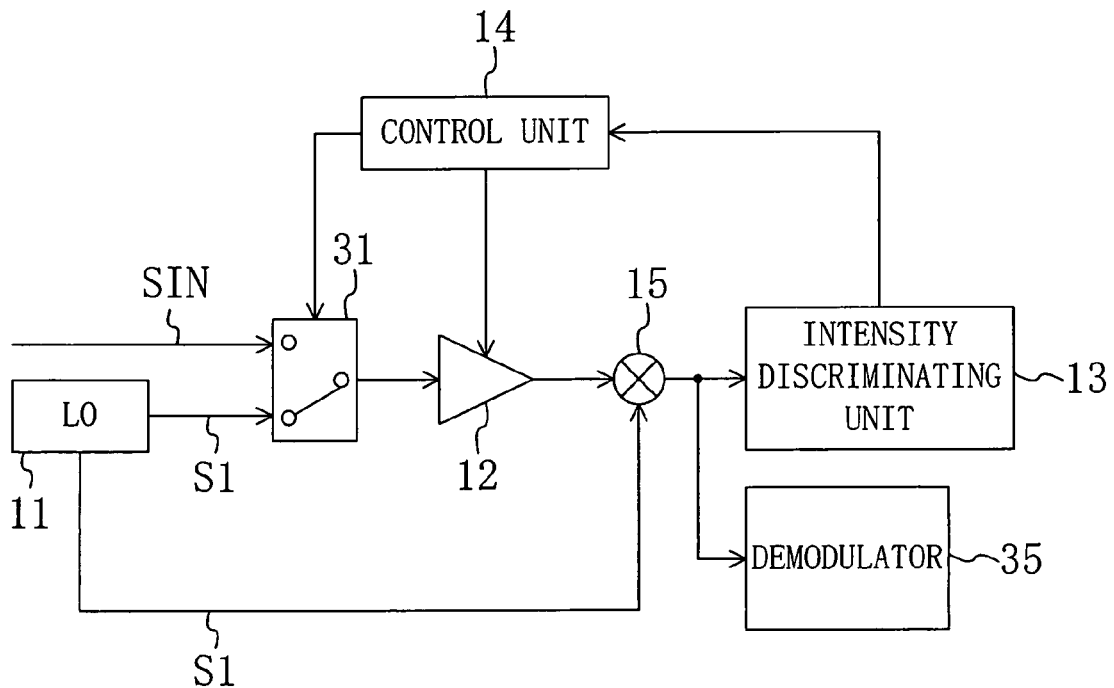
FIG. 1 is a diagram for showing the architecture of a radio communication system according to Embodiment 1 of the invention.

FIG. 1 is a diagram for showing the architecture of a radio communication system according to Embodiment 1 of the invention. In FIG. 1, a reference numeral 11 denotes a local oscillator (LO), a reference numeral 12 denotes a low noise amplifier (LNA) capable of hopping a frequency band to be amplified, a reference numeral 13 denotes an intensity discriminating unit for discriminating signal intensity, a reference numeral 14 denotes a control unit for controlling a frequency band of the low noise amplifier 12, a reference numeral 15 denotes a mixer for integrating an oscillation output signal S1 of the local oscillator 11 and an output signal of the low noise amplifier 12, a reference numeral 31 denotes a selection unit receiving an input signal SIN and the oscillation output signal S1 of the local oscillator 11 as inputs for selectively outputting one of them, and a reference numeral 35 denotes a demodulator for demodulating an output signal of the mixer 15.

The control unit 14 controls not only the frequency band of the low noise amplifier 12 but also the selection operation of the selection unit 31. An output signal of the selection unit 31 is supplied to the low noise amplifier 12, and the low noise amplifier 12 amplifies the received output signal of the selection unit 31.

The operation performed by the radio communication system having the architecture of FIG. 1 will now be described.

First, the control unit 14 controls the selection unit 31 to selectively output the oscillation output signal S1 of the local oscillator 11. In this first state, the oscillation output signal S1 of the local oscillator 11 is amplified by the low noise amplifier 12. Then, the output signal of the low noise amplifier 12 and the oscillation output signal S1 of the local oscillator 11 are integrated by the mixer 15, and an output signal of the mixer 15 corresponding to the result of the integration is supplied to the intensity discriminating unit 13. The intensity discriminating unit 13 discriminates the signal intensity of the output signal of the mixer 15. The control unit 14 receives the discrimination result obtained by the discriminating unit 13, so as to learn a frequency band of the low noise amplifier 12 for maximizing the signal intensity. In other words, the control unit 14 makes frequency bands of the low noise amplifier 12 scanned for learning a frequency band for maximizing the signal intensity in the intensity discriminating unit 13, so as to control the low noise amplifier 12 to operate at a point where the signal intensity is maximum.

In actual communication, the control unit 14 controls the selection unit 31 to selectively output the input signal SIN. In this second state, the frequency band learned in the first state is set in the low noise amplifier 12. The low noise amplifier 12 amplifies the input signal SIN selectively output from the selection unit 31, and the mixer 15 integrates the output signal of the low noise amplifier 12 and the oscillation output signal S1 of the local oscillator 11. The demodulator 35 demodulates the output signal of the mixer 15.

At this point, it is assumed that the oscillation frequency of the local oscillator 11 is indicated by f1 (Hz) and that the center frequency of the frequency band of the low noise amplifier 12 is indicated by fN (Hz). The output of the mixer 15 is the maximum when the frequency f1 and the frequency fN accord with each other. On the other hand, when the frequency f1 and the frequency fN are shifted from each other for any reason such as a temperature or voltage variation, the output of the mixer 15 is smaller than when the frequencies f1 and fN accord with each other.

Therefore, in the first state, namely, in the state where the low noise amplifier 12 amplifies the oscillation output signal S1 of the local oscillator 11, a frequency band for maximizing the signal intensity of the output of the mixer 15 is learned, so that the shift of the frequency band of the low noise amplifier 12 can be corrected. In addition, for this shift correction, there is no need to send a pilot signal from a transmitter. Accordingly, degradation of communication performance can be prevented in a short period of time, resulting in improving the communication performance.

Figure 2:
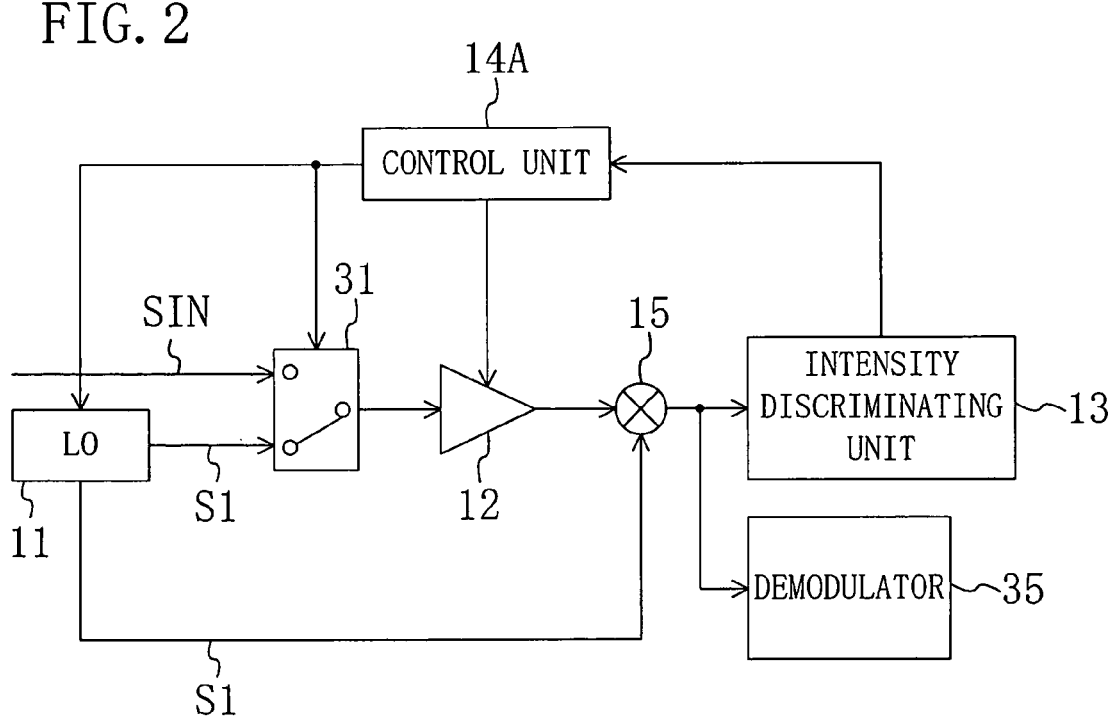
FIG. 2 is a diagram of a modification of the architecture of FIG. 1.

In order that a carrier frequency can be hopped as in the MB-OFDM system, the local oscillator 11 is preferably constructed to be capable of hopping the oscillation frequency. In addition, the oscillation frequency of the local oscillator 11 may be controlled by a control unit 14A as shown in FIG. 2. Thus, the shift of the frequency band of the low noise amplifier 12 from each carrier frequency can be corrected.

Embodiment 2

Figure 3:
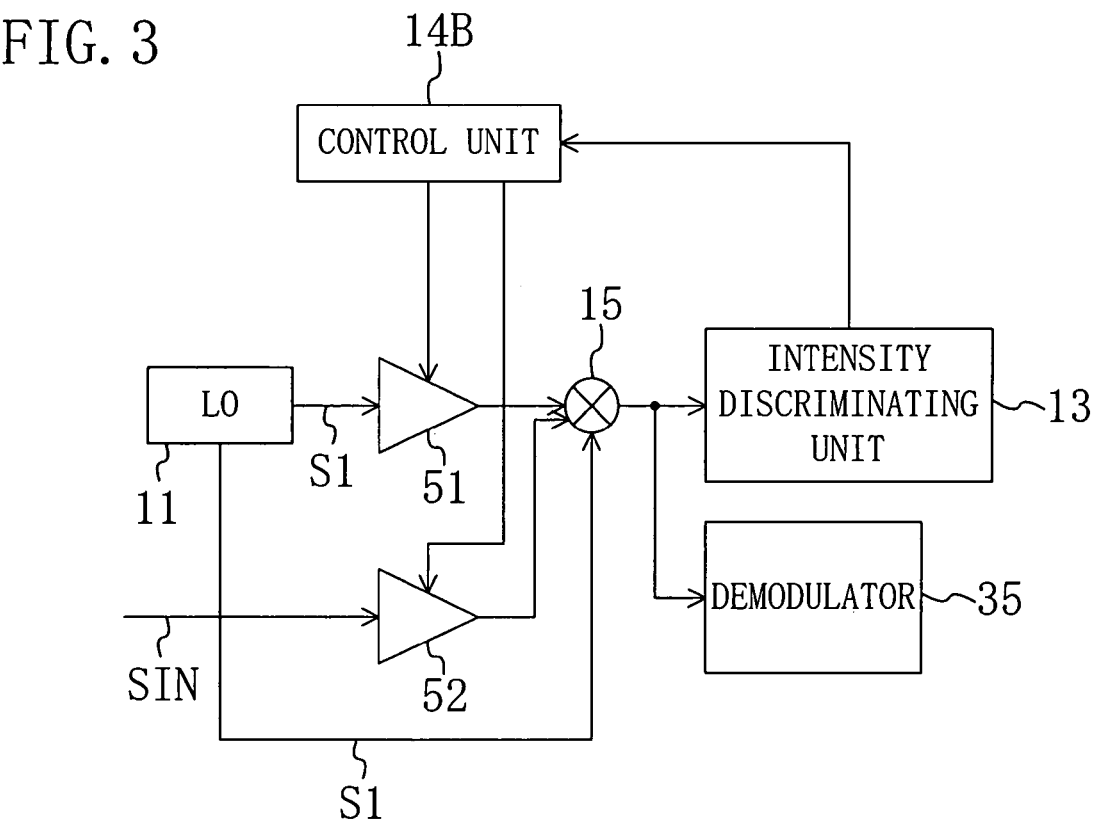
FIG. 3 is a diagram for showing the architecture of a radio communication system according to Embodiment 2 of the invention.

FIG. 3 is a diagram for showing the architecture of a radio communication system according to Embodiment 2 of the invention. In FIG. 3, like reference numerals are used to refer to like elements shown in FIG. 1. As compared with the architecture of FIG. 1, first and second low noise amplifiers 51 and 52 each capable of hopping the frequency band to be amplified are provided in FIG. 3 instead of the low noise amplifier 12 and the selection unit 31. The first low noise amplifier 51 receives and amplifies an output signal S1 of a local oscillator 11. On the other hand, the second low noise amplifier 52 receives and amplifies an input signal SIN. A control unit 14B controls the amplification operations and the frequency bands of the first and second low noise amplifiers 51 and 52, and a mixer 15 integrates the output signal S1 of the local oscillator 11 and an output signal of the first or second low noise amplifier 51 or 52.

The operation of the radio communication system having the architecture of FIG. 3 will now be described. First, the control unit 14B controls the first low noise amplifier 51 to perform the amplification. In this first state, the oscillation output signal S1 of the local oscillator 11 is amplified by the first low noise amplifier 51. Then, an output signal of the first low noise amplifier 51 and the oscillation output signal S1 of the local oscillator 11 are integrated by the mixer 15, and an output signal of the mixer 15 corresponding to the result of the integration is supplied to an intensity discriminating unit 13. The intensity discriminating unit 13 discriminates the signal intensity of the output signal of the mixer 15. The control unit 14B receives the result of the discrimination of the intensity discriminating unit 13, and learns a frequency band of the first low noise amplifier 51 for maximizing the signal intensity. In other words, the control unit 14B makes frequency bands of the first low noise amplifier 51 scanned, so as to learn a frequency band for maximizing the signal intensity in the intensity discriminating unit 13.

In actual communication, the control unit 14B controls the second low noise amplifier 52 to perform the amplification. In this second state, the frequency band of the second low noise amplifier 52 is set to be equal to the frequency band of the first low noise amplifier 51 learned in the first state. The second low noise amplifier 52 amplifies the input signal SIN in the set frequency band. The mixer 15 integrates an output signal of the second low noise amplifier 52 and the oscillation output signal S1 of the local oscillator 11. A demodulator 35 demodulates an output signal of the mixer 15.

Owing to the aforementioned architecture and operation, the same effects as those attained in Embodiment 1 can be attained. Specifically, in the first state, namely, in the state where the first low noise amplifier 51 amplifies the oscillation output signal S1 of the local oscillator 11, a frequency band for maximizing the signal intensity of the output of the mixer 15 is learned, and the thus learned frequency band is set in the second low noise amplifier 52, so as to correct a shift of the frequency band of the second low noise amplifier 52. In addition, for this shift correction, there is no need to send a pilot signal from a transmitter. Accordingly, degradation of communication performance can be prevented in a short period of time, resulting in improving the communication performance.

Furthermore, as compared with Embodiment 1, since no selection unit is provided at a stage previous to the second low noise amplifier 52, degradation of a high frequency characteristic otherwise caused by circuit elements of the selection unit can be suppressed.

In the same manner as in Embodiment 1, the local oscillator 11 is preferably constructed to be capable of hopping the oscillation frequency. In addition, the control unit 14B may control the oscillation frequency of the local oscillator 11.

Figure 6:
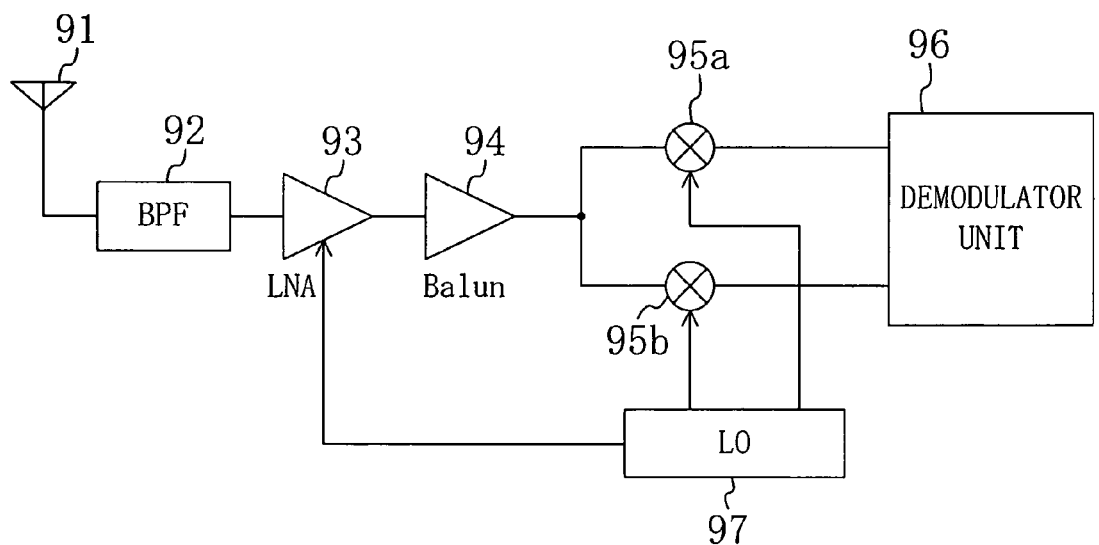
FIG. 6 is a diagram for showing the architecture of a conventional radio communication system.

In each of Embodiments 1 and 2, a balun for converting a single input to a differential signal may be provided at a stage subsequent to the low noise amplifier so as to shift a frequency by using a plurality of mixers as in the conventional architecture shown in FIG. 6.

Embodiment 3

In Embodiment 3 of the invention, the present invention is applied to a communication system in which frequency shift by using a mixer is not performed.

Figure 4:
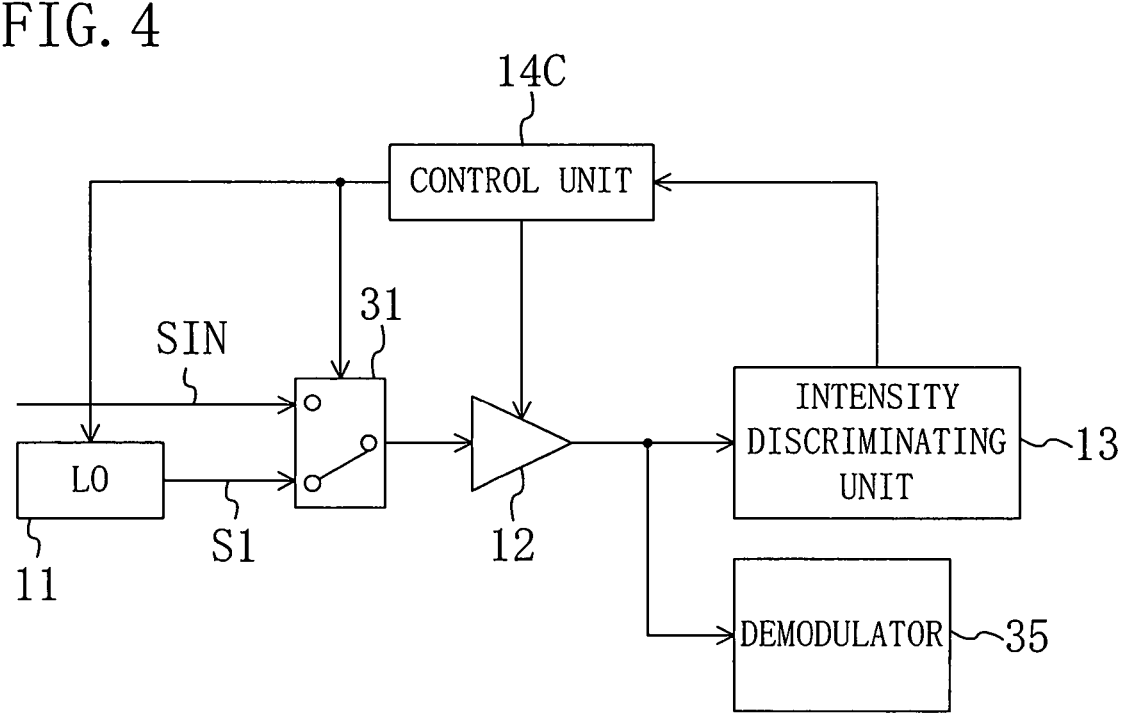
FIG. 4 is a diagram for showing the architecture of a radio communication system according to Embodiment 3 of the invention.

FIG. 4 is a diagram for showing the architecture of a radio communication system according to Embodiment 3 of the invention. In FIG. 4, like reference numerals are used to refer to like elements shown in FIG. 1. As compared with the architecture of FIG. 1, a mixer 15 is omitted, an intensity discriminating unit 13 discriminates the signal intensity of an output of a low noise amplifier 12, and a demodulator 35 receives and demodulates the output of the low noise amplifier 12 in the architecture of FIG. 4.

In employing the architecture of FIG. 4, in the communication system where no mixer is used, a pulse signal is once input to a band pass filter to select a frequency component and then output from an antenna on a transmitting side. On the other hand, for amplifying a signal received at an antenna on a receiving side, it is necessary to amplify a signal of the frequency band selected on the transmitting side. Therefore, the local oscillator 11 outputs a center frequency of a transmitting signal, namely, an oscillation output signal of the center frequency selected by the band pass filter.

The operation of the radio communication system having the architecture of FIG. 4 will now be described. First, a control unit 14C controls a selection unit 31 to selectively output an oscillation output signal S1 of the local oscillator 11. In this first state, the oscillation output signal S1 of the local oscillator 11 is amplified by the low noise amplifier 12. The intensity discriminating unit 13 discriminates the signal intensity of an output signal of the low noise amplifier 12. The control unit 14C receives the result of the discrimination of the intensity discriminating unit 13, and learns a frequency band of the low noise amplifier 12 for maximizing the signal intensity. In other words, the control unit 14C makes frequency bands of the low noise amplifier 12 scanned for learning a frequency band for maximizing the signal intensity in the intensity discriminating unit 13, so as to control the low noise amplifier 12 to operate at a point where the signal intensity is maximum.

In actual communication, the control unit 14C controls the selection unit 31 to selectively output the input signal SIN. In this second state, the frequency band learned in the first state is set in the low noise amplifier 12. The low noise amplifier 12 receives and amplifies the input signal SIN selectively output from the selection unit 31, and a demodulator 35 demodulates the output signal of the low noise amplifier 12.

In this manner, in the first state, namely, in the state where the low noise amplifier 12 amplifies the oscillation output signal S1 of the local oscillator 11, a frequency band for maximizing the signal intensity of the output of the low noise amplifier 12 is learned, so that the shift of the frequency band of the low noise amplifier 12 can be corrected. In addition, for this shift correction, there is no need to send a pilot signal from a transmitter. Accordingly, degradation of communication performance can be prevented in a short period of time, resulting in improving the communication performance.

The local oscillator 11 is constructed to be capable of hopping the oscillation frequency, and the control unit 14C controls the oscillation frequency of the local oscillator 11. Therefore, a carrier frequency can be hopped as in the MB-OFDM system, and hence, the shift of the frequency band of the low noise amplifier 12 from each carrier frequency can be corrected.

Embodiment 4

Figure 5:
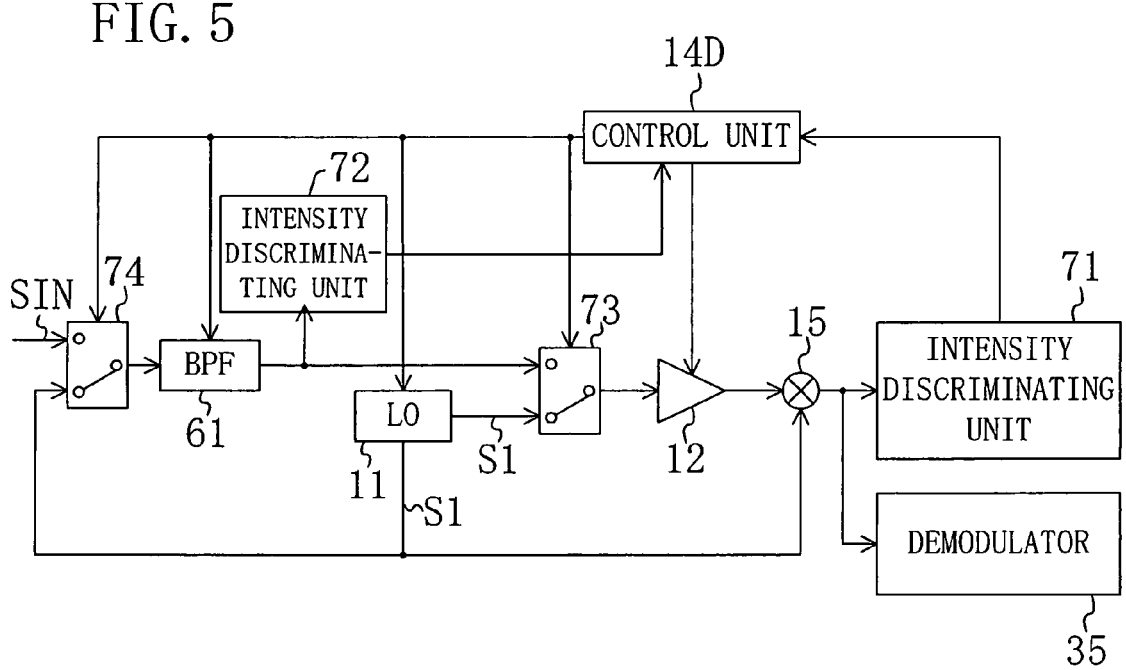
FIG. 5 is a diagram for showing the architecture of a radio communication system according to Embodiment 4 of the invention.

FIG. 5 is a diagram for showing the architecture of a radio communication system according to Embodiment 4 of the invention. In FIG. 5, like reference numerals are used to refer to like elements shown in FIG. 1. In FIG. 5, a reference numeral 61 denotes a band pass filter (BPF) for selecting merely a desired frequency component, a reference numeral 71 denotes a first intensity discriminating unit for discriminating the signal intensity of an output of a mixer 15, a reference numeral 72 denotes a second intensity discriminating unit for discriminating the signal intensity of an output of the band pass filter 61, a reference numeral 73 denotes a first selection unit for receiving an oscillation output signal S1 of a local oscillator 11 and the output of the band pass filter 61 as inputs for selecting one of them, and a reference numeral 74 denotes a second selection unit for receiving an input signal SIN and the oscillation output signal S1 of the local oscillator 11 as inputs for selecting one of them.

A control unit 14D controls not only the frequency band of a low noise amplifier 12 but also the frequency band of the band pass filter 61 and the selection operations of the first and second selection units 73 and 74. An output signal of the first selection unit 73 is supplied to the low noise amplifier 12, and an output signal of the second selection unit 74 is supplied to the band pass filter 61.

The operation of the radio communication system having the architecture of FIG. 5 will now be described. It is noted that the first discriminating unit 71 and the first selection unit 73 respectively correspond to the discriminating unit 13 and the selection unit 31 of FIG. 1 and the operation performed after the first selection unit 73 is the same as that performed in Embodiment 1.

First, the control unit 14D controls the first selection unit 73 to selectively output the oscillation output signal S1 of the local oscillator 11 and the second control unit 74 to selectively output the oscillation output signal S1 of the local oscillator 11. In this first state, the control unit 14D makes frequency bands of the low noise amplifier 12 scanned, so as to learn a frequency band for maximizing the signal intensity in the first intensity discriminating unit 71 in the same manner as in Embodiment 1. Also, the oscillation output signal S1 of the local oscillator 11 is also supplied to the band pass filter 61 through the second selection unit 74, and the second intensity discriminating unit 72 discriminates the signal intensity of an output signal of the band pass filter 61. The control unit 14D receives the result of the discrimination of the second intensity discriminating unit 72 so as to learn a frequency band of the band pass filter 61 for maximizing the signal intensity. In other words, the control unit 14D makes passing frequency bands of the band pass filter 61 scanned, so as to learn a passing frequency band for maximizing the intensity.

In actual communication, the control unit 14D controls the first selection unit 73 to selectively output the output signal of the band pass filter 61 and the second selection unit 74 to selectively output the input signal SIN. In this second state, the frequency bands leaned in the first state are respectively set in the low noise amplifier 12 and the band pass filter 61. The band pass filter 61 receives the input signal SIN, and the output signal of the band pass filter 61 is supplied to the low noise amplifier 12. A mixer 15 integrates the output signal of the low noise amplifier 12 and the oscillation output signal S1 of the local oscillator 11. A demodulator 35 demodulates an output signal of the mixer 15.

In this embodiment, the shift of the frequency band of the low noise amplifier 12 can be corrected in the same manner as in Embodiment 1. In addition, the shift of the frequency band of the band pass filter 61 can be similarly corrected. Moreover, for the shift correction, there is no need to send a pilot signal from a transmitter. Accordingly, degradation of communication performance can be prevented in a short period of time, resulting in improving the communication performance.

The local oscillator 11 is constructed to be capable of hopping the oscillation frequency, and the control unit 14D controls the oscillation frequency of the local oscillator 11. Therefore, a carrier frequency can be hopped as in the MB-OFDM system, and hence, the shift of the frequency band of each of the low noise amplifier 12 and the band pass filter 61 from each carrier frequency can be corrected.

In this embodiment, the shifts of the frequency bands of both the low noise amplifier 12 and the band pass filter 61 are corrected. Instead, the first intensity discriminating unit 71 and the first selection unit 73 may be removed from the architecture of FIG. 5, so that the shift of the frequency band of the band pass filter 61 alone can be corrected.

In radio communication equipment including the radio communication system described in each embodiment, variation in the gain of the low noise amplifier is suppressed so as to reduce a gain margin of the low noise amplifier in the radio communication system, and therefore, the power consumption can be reduced in the whole equipment.

Thus, the present invention is useful for improving the communication performance of a radio communication system correlated with the UWB communication or the like.

What is claimed is:

1. A radio communication system comprising:
   a local oscillator;
   a selection unit that receives an input signal and an oscillation output signal of said local oscillator as inputs and selectively outputs one of said received signals;
   a low noise amplifier that is capable of hopping a frequency band to be amplified and amplifies an output of said selection unit;
   a mixer that integrates the oscillation output signal of said local oscillator and an output signal of said low noise amplifier;
   an intensity discriminating unit that discriminates signal intensity of an output of said mixer; and
   a control unit that controls a selection operation of said selection unit and a frequency band of said low noise amplifier,
   wherein said control unit learns a frequency band of said low noise amplifier for maximizing the signal intensity on the basis of a discrimination result of said intensity discriminating unit in a first state where said selection unit is controlled to selectively output the oscillation output signal of said local oscillator, and
   said control unit sets said frequency band learned in the first state in said low noise amplifier in a second state where said selection unit is controlled to selectively output said input signal.

2. The radio communication system of claim 1,
   wherein said local oscillator is capable of hopping an oscillation frequency, and
   said control unit controls the oscillation frequency of said local oscillator.

3. A radio communication system comprising:
   a local oscillator;
   a first low noise amplifier that is capable of hopping a frequency band to be amplified and amplifies an oscillation output signal of said local oscillator;
   a second low noise amplifier that is capable of hopping a frequency band to be amplified and amplifies an input signal;
   a mixer that integrates the oscillation output signal of said local oscillator and an output signal of said first or second low noise amplifier;
   an intensity discriminating unit that discriminates signal intensity of an output of said mixer; and
   a control unit that controls amplification operations and frequency bands of said first and second low noise amplifiers,
   wherein said control unit learns a frequency band of said first low noise amplifier for maximizing the signal intensity on the basis of a discrimination result of said intensity discriminating unit in a first state where said first low noise amplifier is controlled to perform an amplification operation, and
   said control unit sets said frequency band of said first low noise amplifier learned in the first state in said second low noise amplifier in a second state where said second low noise amplifier is controlled to perform an amplification operation.

4. The radio communication system of claim 3,
   wherein said local oscillator is capable of hopping an oscillation frequency, and
   said control unit controls the oscillation frequency of said local oscillator.

5. A radio communication system comprising:
   a local oscillator;
   a selection unit that receives an input signal and an oscillation output signal of said local oscillator as inputs and selectively outputs one of said received signals;
   a low noise amplifier that is capable of hopping a frequency band to be amplified and amplifies an output of said selection unit;
   an intensity discriminating unit that discriminates signal intensity of an output of said low noise amplifier; and
   a control unit that controls a selection operation of said selection unit and a frequency band of said low noise amplifier,
   wherein said control unit learns a frequency band of said low noise amplifier for maximizing the signal intensity on the basis of a discrimination result of said intensity discriminating unit in a first state where said selection unit is controlled to selectively output the oscillation output signal of said local oscillator, and
   said control unit sets said frequency band learned in the first state in said low noise amplifier in a second state where said selection unit is controlled to selectively output said input signal.

6. The radio communication system of claim 5,
   wherein said local oscillator is capable of hopping an oscillation frequency, and
   said control unit controls the oscillation frequency of said local oscillator.

7. A radio communication system comprising:
   a local oscillator;
   a selection unit that receives an input signal and an oscillation output signal of said local oscillator as inputs and selectively outputs one of said received signals;

a band pass filter that is capable of hopping a frequency band to be selected and selects a frequency band in response to an output of said selection unit;

an intensity discriminating unit that discriminates signal intensity of an output of said band pass filter; and a control unit that controls a selection operation of said selection unit and a frequency band of said band pass filter, wherein said control unit learns a frequency band of said band pass filter for maximizing the signal intensity on the basis of a discrimination result of said intensity discriminating unit in a first state where said selection unit is controlled to selectively output the oscillation output signal of said local oscillator, and said control unit sets said frequency band learned in the first state in said band pass filter in a second state where said selection unit is controlled to selectively output said input signal.

8. The radio communication system of claim 7, wherein said local oscillator is capable of hopping an oscillation frequency, and said control unit controls the oscillation frequency of said local oscillator.

\* \* \* \* \*